Patented Mar. 3, 1942

2,274,831

UNITED STATES PATENT OFFICE 2,274,831

POLYAMIDES AND PROCESS FOR THEIR PREPARATION

Julian W. Hill, Wilmington, Del., assignor to E. I. du Pont de Nemours & Company, Wilmington, Del., a corporation of Delaware No Drawing. Application July 20, 1939, Serial No. 285,589

12 Claims. (Cl. 260—78)

This invention relates to polymeric materials and more particularly to linear polyamides.

In U. S. Patents 2,071,250, 2,071,253, 2,130,523 and 2,130,948 have been disclosed polyamides derived from amino acids of formula $NH_2RCOOH$, and from diamines of the formula $NH_2RNH_2$ and dicarboxylic acids of the formula $HOOCR'COOH$ in which R and R' are divalent hydrocarbon radicals. These polyamides can generally be obtained in the form of superpolyamides, that is products which can be spun into useful filaments. These filaments are capable of being drawn into oriented fibers. In U. S. Patent 2,158,064 have been disclosed polyamides which are structurally similar to the foregoing polyamides of the diamine-dibasic acid type except that one or both of the reactants employed in their preparation contain one or more hetero atoms of the oxygen family. By "hetero atom" is meant an atom other than carbon which appears in the chain of atoms separating the functional or reactive groups in the polyamide-forming reactants, that is, the amino and carboxyl groups in the case of an amino acid, the amino groups in the case of a diamine, and the carboxyl groups in the case of a dibasic acid.

It has now been discovered that polyamides possessing further new and useful properties may be prepared by polymerizing amino acids containing as a hetero atom a tertiary amino nitrogen or by reacting diamines and dibasic acids, either or both of which contain a hetero atom of tertiary amino nitrogen.

This invention has as an object the preparation of new and useful linear polyamides and compositions comprising them which are useful in the textile and other arts. Further objects will appear hereinafter.

These objects are accomplished by heating to reaction temperature a polyamide-forming composition comprising a reactant which contains a tertiary nitrogen atom in the chain of atoms separating the amide-forming groups in said reactant, said tertiary nitrogen being joined to other atoms by single bonds only, until a polymeric product is obtained. The polyamide-forming composition may consist of a polymerizable amino acid or amide-forming derivative thereof, or it may consist of a mixture of diamine and dibasic carboxylic acid or amide-forming derivatives thereof. When such tertiary amino nitrogen is present in an amino acid or amide-forming derivative thereof, its position may be represented by the formula

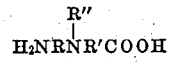

when such tertiary amino nitrogen is present in the diamine its position may be illustrated by the formula

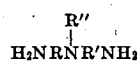

and when such tertiary amino nitrogen is present in the dibasic carboxylic acid or amide-forming derivative thereof, its position may be illustrated by the formula

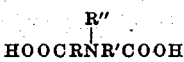

In these formulas R and R' represent divalent hydrocarbon radicals and R'' a monovalent hydrocarbon radical.

In the preferred practice of the invention, substantially chemically equivalent amounts of the diamine or an amide-forming derivative thereof and the dibasic carboxylic acid or amide-forming derivative thereof (for example, the ester, half-ester, acid chloride, anhydride, or amide) are heated in the absence of a solvent (fusion method), or in the presence of a solvent at a temperature which is generally in the range of 150–300° C., and preferably at 180–275° C., until a polymer of the desired properties is formed. The polymerization reaction generally involves the formation of the by-products, water, alcohol, phenol, hydrogen chloride, or ammonia, depending upon the derivative of the dibasic acid or diamine used.

The first reaction which occurs when a diamine and a dicarboxylic acid are mixed and brought into sufficiently intimate contact is the formation of a diamine-dicarboxylic acid salt. It is often desirable to separate and purify the salt prior to its conversion into polyamide. The salts are generally crystalline and are readily purified by recrystallization from suitable solvents, such as water or alcohol, and have definite compositions. The preparation of the salt affords an automatic means for adjusting the amine and dibasic acid reactants to substantial equivalency, and it avoids the difficulties attendant upon the preservation of the isolated amine in a state of purity. The formation and purification of the salt tends to eliminate impurities present in the original diamine and dibasic acid. I do not, however, limit myself to polyamides prepared only from their salts.

When applied to the preparation of polyamides of the diamine-dibasic acid type, the process is limited to the use of amines containing two primary or two secondary or one primary and one secondary amino groups; in other words, amines containing two functional amide-forming amino nitrogens, that is, nitrogens bearing at least one hydrogen atom. Of this group, the diprimary diamine reacts most readily and is the preferred group. This does not mean that the amine cannot contain tertiary amino groups in addition to the amide-forming amino groups. It is evident that a large number of possible combinations of reactants are possible in the preparation of the products of this invention. For example, it is possible to make polyamides in which the diamine represented contains a hetero atom, a product in which the dibasic acid represented contains a hetero atom, or a product in which both the diamine and dibasic acid contain hetero atoms. It is also possible to prepare products in which only a portion of the diamine or dibasic acid represented contains a hetero atom. Hydrolysis with strong mineral acids, for instance, hydrochloric, converts these polymeric products into dibasic acid and diamine (as the mineral acid salt) from which they were derived, and the nitrogen hetero atom is also converted into a pentavalent element containing a mineral acid salt group.

When the process is applied to the preparation of polyamides of the amino acid type, for example,

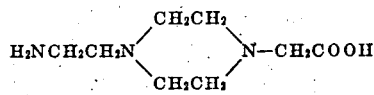

it is necessary that only one of the amino groups be capable of amide-formation; that is, only one primary or secondary amino group should be present, and preferably there should be a chain of at least 5 atoms separating the amide-forming amino and the carboxyl groups.

The polyamides referred to hereinafter may be prepared by polymerizing a salt of a dibasic acid and a diamine, and interpolyamides conveniently can be prepared by mixing the salts prior to polymerization.

The following examples, in which parts are by weight, are illustrative of the preparation and application of the products of this invention.

*Example I*

*Polyamides from methyliminodiacetic acid and pentamethylenediamine.*—Equivalent amounts of methyliminodiacetic acid,

HOOCCH₂N(CH₃)CH₂COOH (21.5 parts), and pentamethylenediamine (14.6 parts) with phenol (15 parts) are heated at 180–190° C. for 2 hours, and then at 190° C. in vacuum for 17 hours. The residue is a tough, light brown resin, soluble in water, alcohol, glacial acetic acid, and 10% hydrochloric acid. Addition of alkali to an aqueous or acid solution causes temporary separation of a viscous oil which redissolves on dilution.

This product forms, with picric acid, a pasty insoluble precipitate. With mercuric chloride in alcoholic solution, a precipitate is obtained in the form of a white powder which melts over the range 170–180° C., and which becomes pasty in a few hours at room temperature.

*Example II*

*Polymer from ethylenediamine and methyliminodiacetic acid.*—Ethylenediamine (12 parts) is heated with methyliminodiacetic acid (29.8 parts) in phenol (20 parts) at 170–190° C. The mixture becomes homogeneous after 24 hours heating. It is then heated 2 hours in vacuum at 190° C. The polymer is a brown resin that readily dissolves in water; addition of alkali to the aqueous solution produces a cloudiness which disappeared on dilution.

*Example III*

*Polymer from N,N'-diketopiperazine diacetic acid and decamethylenediamine.*—The decamethylenediamine salt of N,N'-diketopiperazine diacetic acid,

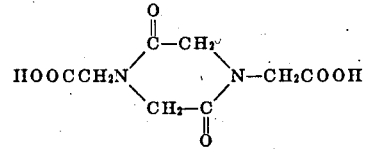

is made by treating a solution of 54 parts of the dibasic acid in a little water with a solution of the diamine (60 parts) in alcohol (100 parts). The solvent is evaporated on the steam bath and the residue washed with absolute alcohol. The salt melts at 150–160° C.

The salt is heated with m-cresol (50 parts) at 210° C. for 8 hours and the solution is drowned in a mixture of ethyl acetate (⅔ part) and ethyl alcohol (⅓ part). The polymer is a brown powder softening around 120° C. and melting completely at 150° C.

*Example IV*

*Polymer of hexamethylenediamine with piperazine diacetic acid.*—Equimolecular quantities of piperazine diacetic acid,

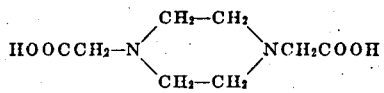

and hexamethylenediamine are heated 6 hours in cresol. The polymer is drowned in and washed with ethyl acetate-ethyl alcohol mixture. It is a white powder melting at 168° C., and having a viscosity of 0.41; it can be spun into continuous filaments. The polymer is soluble in alcohol and soluble in water containing a trace of acetic acid. Addition of alkali causes precipitation of the polymer.

The polymer can also be prepared from the salt of hexamethylenediamine and piperazine diacetic acid. This salt is prepared by adding hexamethylenediamine (12 parts) to a solution of the dibasic acid (20.2 parts) in boiling water (330 parts) and is precipitated by adding alcohol (800 parts) and ether (1500 parts) to the aqueous solution (yield 88%). The melting point of the salt is 251–254° C. When heated for 7 hours in cresol at 190–200° C. the salt is converted into polymer having a melting point of 169–170° C. and an intrinsic viscosity of 0.34.

*Example V*

The diamine NH₂(CH₂)₃N(CH₃)(CH₂)₃NH₂ (242 parts) and adipic acid (2435 parts) are heated in a closed vessel at 210–240° C. for 2.5 hours. The vessel is opened and heated at 180–200° C. under vacuum for 2 hours. The resultant polyamide is resinous, soluble in alcohol, and can be spun into filaments.

*Example VI*

Triglycoldiamine,

NH₂CH₂CH₂OCH₂CH₂OCH₂CH₂NH₂

(1250.5 parts), and N-methyliminodiacetic acid (1242 parts) are heated in an autoclave for 3 hours at 220–230° C. under an atmosphere of nitrogen. The autoclave is opened and the heating is continued for 3 hours at 196° under an atmosphere of nitrogen and finally for 2 hours at 196° C. under vacuum. The material is very low melting and is exceedingly soluble in water.

*Example VII*

Piperazine diacetic acid (730.5 parts) and triglycoldiamine (535.2 parts) are dissolved in water (5000 parts) and the solution is then added to 25,000 parts of absolute ethanol. The salt which melts at 220° C., crystallizes from this solution.

The salt is sealed in an autoclave which is alternately evacuated and filled with purified nitrogen before finally being sealed under vacuum. The salt is heated for 3 hours at 230–250° C., after which the autoclave is opened and the polymer is heated for 3 hours at 256° C. under an atmosphere of nitrogen, and finally for one hour at 256° C. under vacuum. A clear, tough polymer is obtained which softens at 80° C. and completely melts at 115° C. The polymer has an intrinsic viscosity of 0.54. It forms tough pliable films when cast from methanol or water in which it is readily soluble. The polymer can be spun into fibers which possess cold-drawing properties.

As will be apparent from the foregoing examples the polyamides of this invention can be prepared in the presence or absence of a solvent or diluent. When easily volatile reactants are used, as for example ethylenediamine, it is desirable to carry out at least the initial stage of the reaction in a closed vessel or under reflux to prevent loss of the reactants. The products of this invention are conveniently prepared in an open reactor equipped with a reflux condenser which permits the water or other by-product of the reaction to escape but not the reactants or solvent. During the later stages of the reaction it is often desirable to decrease the pressure in order to complete the reaction and, if desired, to distill off the solvent. The product may be removed from the solvent by precipitataion methods, however. Especially useful solvents for the preparation of the polyamides of this invention are monohydric phenols such as phenols, cresols, xylenols, hydroxydiphenyls, and the like. The products of this invention are also conveniently prepared by sealing the two reactants or the salt of the two reactants in an autoclave either evacuated or filled with purified nitrogen, and heating until the "half-made" polymer is obtained, and finishing the polymerization by heating the open vessel under vacuum.

The reaction is preferably carried out in the absence of air. Antioxidants can be added if desired. While it usually is unnecessary to add a catalyst, inorganic materials of alkaline reaction, such as oxides and carbonates, and acidic materials such as halogen salts of polyvalent elements, for example, aluminum and tin, often are helpful.

Numerous acids other than those already mentioned, containing nitrogen as a hetero atom, may be used. Examples of some of these acids are: N-phenyliminodiacetic acid, N-ethyliminodiacetic acid, N-methyliminodipropionic acid, N-methyliminodibutyric acid, and the general class of dibasic acids derived by the condensation of the amines of the general formula $RNH_2$, in which R may be either aryl, alkyl, or aralkyl, with omega halogenated alkyl acids. Dibasic acids containing two or more nitrogens as hetero atoms are within the scope of this invention. They may be prepared by reacting amines of the general formula $RNHR'NHR$ with omega halogenated alkyl acids. Dibasic acids containing nitrogen as a hetero atom and also hetero atoms other than a tertiary nitrogen are within the scope of this invention. Such an acid may be prepared by condensing N-monomethylethanolamine with an omega halogenated alkyl acid. Analogs of piperazine diacetic acid, such as compounds derived from five-membered rings and containing two nitrogens, are also within the scope of this invention.

The dibasic acids containing the hetero nitrogen atom or amide-forming derivative of such dibasic acids can be reacted with numerous types of diamines. Such diamines include diprimary alkylene diamines, diprimary arylene diamines, disecondary diamines of the two aforementioned classes, and monoprimary monosecondary diamines of these same two aforementioned classes. These diamines may contain hetero atoms such as oxygen or sulfur as disclosed in U. S. Patent 2,158,064 when used in conjunction with polyamide-forming reactants containing a hetero nitrogen atom, or they may contain a tertiary nitrogen as a hetero atom. A convenient synthesis of diamines containing a hetero nitrogen atom is by the reaction of one molecular proportion of an amine of the formula $RNH_2$ where R is alkyl, aralkyl, or aryl, with two molecular proportions of compounds having the general formula $XCH_2RCH_2CN$ where X is either chlorine, bromine, or iodine, and where R is alkylene, arylene, aralkylene, or a cycloalkylene group. Subsequent hydrogenattion of such a compound yields the corresponding diamine. Diamines containing two tertiary nitrogens as hetero atoms may be prepared by applying this type of reaction to a disecondary diamine having the formula $RNHR'NHR$ and subsequently hydrogenating the reaction product. Specific examples are di(ω-aminobutyl)-methylamine, di(ω-aminohexyl)-methylamine, di(ω-aminopentyl)-phenylamine and di(ω-aminoethyl)piperazine. Polyamides may be prepared by reacting these latter diamines with acids or amide-forming derivatives of dibasic dicarboxylic acids such as diethyl carbonate, malonic acid, adipic acid, pimelic acid, sebacic acid, and diphenylolpropane diacetic acid. They may also be reacted with dibasic acids or amide-forming derivatives of dibasic dicarboxylic acids containing a tertiary nitrogen as a hetero atom. Interpolyamides (i. e., polyamides derived from a mixture of polyamide-forming reactants capable of yielding more than one polyamide if reacted in suitable combinations) may also be obtained by copolymerizing the aforesaid reactants with reactants such as hexamethylene diammonium adipate, decamethylene diammonium sebacate, hexamethylene diammonium sebacate, and with amino acids such as 6-aminocaproic acid and 11-aminoundecanoic acid.

Preferably the diamine and dibasic acid reactants are so chosen that the sum of their radical lengths (defined as in U. S. 2,130,948) is at least 9.

Compounds which are useful as textile finishings agents may be prepared by treating the products of the invention with 30% hydrogen peroxide, whereby useful amine oxides are formed.

In general the products of this invention are soluble in such solvents as alcohols, phenols, dilute acids, ethylene chlorhydrin, dioxan, ethers of ethyleneglycol, and in some cases water. For the most part they have good compatibility characteristics and can be admixed with drying oils, resins and cellulose derivatives, for example. These properties make the products useful in coating, plastic, sizing, adhesive, impregnating and textile arts, and in dyeing applications. Certain of the products can be used directly as such in the preparation of lacquers, enamels, varnishes, and the like. The fiber-forming compounds of this invention are useful for the manufacture of fibers that will accept acid dyes directly. In general the products exhibit greater affinity for acid dyes than the polyamides of U. S. Patents 2,071,250, 2,071,253, 2,130,523, 2,130,948 and 2,158,064.

As many apparently widely different embodiments of this invention may be made without departing from the spirit and scope thereof, it is to be understood that I do not limit myself to the specific embodiments thereof except as defined in the appended claims.

I claim:

1. A process for making polyamides which comprises heating to reactive temperatures a polymeric carbonamide-forming composition comprising essentially molecules which each contain two and only two reactive groups, the said groups being attached to different carbon atoms, being complementarily carbonamide-forming with other reactive groups attached to molecules in the said composition which each contain two and only two reactive groups, being separated by a divalent organic radical, and belonging to the class of reactive groups consisting of amino and carboxyl groups; the said divalent organic radical in at least a portion of the said molecules containing a tertiary nitrogen atom in its chain.

2. A process for making polyamides which comprises heating to reactive temperatures amide-forming reactants one of which is selected from the class consisting of dicarboxylic acids and amide-forming derivatives of dibasic carboxylic acids, and another of which is a diamine the nitrogen atom in each of whose amide-forming groups carries at least one hydrogen atom, at least one of said reactants containing a tertiary amino nitrogen atom in the chain of atoms separating its amide-forming groups and being joined to other atoms by single bonds only.

3. A process for making polyamides which comprises heating at approximately 150° to 300° C. a diamine each of the amino nitrogens in whose amide-forming groups carries at least one hydrogen atom and a substance of the class consisting of dicarboxylic acids and amide-forming derivatives thereof having a tertiary amino nitrogen atom connected to other atoms by single bonds only in the chain of atoms separating its acid groups.

4. A process for making polyamides which comprises heating at approximately 150° to 300° C. polyamide-forming reactants one of which is a diamine each of the amino nitrogens in whose amide-forming groups carries at least one hydrogen atom, and another of which is selected from the class consisting of dibasic acids of the formula

and amide-forming derivatives thereof, R and R' representing divalent hydrocarbon radicals and R'' a monovalent hydrocarbon radical.

5. A process for making polyamides which comprises heating at approximately 150° to 300° C. polyamide-forming reactants one of which is a diamine of formula

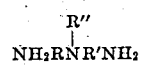

wherein R and R' represent divalent hydrocarbon radicals and R'' a monovalent hydrocarbon radical, and another of which is selected from the class consisting of dicarboxylic acids and amide-forming derivatives of dibasic carboxylic acids.

6. A process for making polyamides which comprises heating at approximately 150° to 300° C. an amino acid of formula

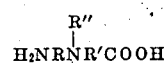

in which R and R' represent divalent hydrocarbon radicals and R'' a monovalent hydrocarbon radical.

7. The process set forth in claim 2 in which the radical lengths of the diamine and the dicarboxylic acid ingredient are such that their sum is at least 9.

8. The polyamide defined in claim 9 in which the recurring structural unit of the polyamide has a chain length of at least 9.

9. A polyamide which upon hydrolysis with strong mineral acids yields amide-forming compounds comprising a dibasic carboxylic acid and a diamine, at least one of said compounds having a tertiary amino nitrogen atom in the chain of atoms separating the amide-forming groups and joined to other atoms by single bonds only.

10. A polyamide which upon hydrolysis with strong mineral acids yields a salt of an amino acid having the formula

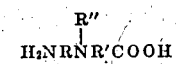

wherein R and R' represent divalent hydrocarbon radicals and R'' a monovalent hydrocarbon radical.

11. The polyamide set forth in claim 9 wherein the said dibasic carboxylic acid is piperazinediacetic acid.

12. The polyamide set forth in claim 9 wherein the said dibasic carboxylic acid is N-methyliminodiacetic acid.

JULIAN W. HILL.